US011352137B2

(12) United States Patent
de Melo et al.

(10) Patent No.: US 11,352,137 B2
(45) Date of Patent: Jun. 7, 2022

(54) AIRCRAFT CARGO PLATFORM ASSEMBLIES AND AIRCRAFT MODULAR AUXILIARY FUSELAGE FUEL TANK SYSTEMS EMPLOYING THE SAME

(71) Applicant: EMBRAER S.A., São José dos Campos CEP—SP (BR)

(72) Inventors: Adilson Martins de Melo, Évora (PT); Andre Rodrigues Ribeiro Pinto, São José dos Campos (BR); Marcos Vinicus, São José dos Campos (BR); Bruno Miguel Oliveira Andrade, Évora (PT)

(73) Assignee: EMBRAER S.A., São José Dos Campos—SP (BR)

( * ) Notice: Subject to any disclaimer, the term of this patent is extended or adjusted under 35 U.S.C. 154(b) by 492 days.

(21) Appl. No.: 16/243,292

(22) Filed: Jan. 9, 2019

(65) Prior Publication Data
US 2020/0216175 A1 Jul. 9, 2020

(51) Int. Cl.
*B64D 9/00* (2006.01)
*B64D 37/04* (2006.01)
*B64D 37/08* (2006.01)
*F16B 45/00* (2006.01)
*B64C 1/00* (2006.01)

(52) U.S. Cl.
CPC .......... *B64D 9/003* (2013.01); *B64D 37/04* (2013.01); *B64D 37/08* (2013.01); *F16B 45/00* (2013.01); *B64C 1/00* (2013.01)

(58) Field of Classification Search
CPC ......... B64D 9/003; B64D 37/04; F16B 45/00; F16B 45/02; Y10T 403/295; Y10T 406/32918
See application file for complete search history.

(56) References Cited

U.S. PATENT DOCUMENTS

| | | | | |
|---|---|---|---|---|
| 5,765,957 A * | 6/1998 | Connell | ................... | F16C 7/06 403/44 |
| 6,889,940 B1 | 5/2005 | Howe | | |
| 7,048,071 B1 * | 5/2006 | Huenink | .............. | A01B 59/004 172/439 |
| 8,851,424 B2 | 10/2014 | Barbosa et al. | | |
| 9,873,519 B2 | 1/2018 | Perry et al. | | |
| 9,963,030 B2 | 5/2018 | Kirk et al. | | |
| 2013/0334367 A1 * | 12/2013 | Larson | ................... | B64D 9/003 244/118.1 |
| 2014/0117163 A1 * | 5/2014 | Simpson | ................ | B64D 37/06 244/135 R |
| 2018/0229809 A1 * | 8/2018 | Stefanoff | .................. | B60P 7/13 |

* cited by examiner

*Primary Examiner* — Joshua J Michener
*Assistant Examiner* — Ashesh Dangol
(74) *Attorney, Agent, or Firm* — Nixon & Vanderhye P.C.

(57) ABSTRACT

Cargo load platform assemblies are especially adapted to provide support for a variety of cargo, such as auxiliary aircraft fuel tanks. According to certain embodiments herein, a load platform is provided which is adapted to being positioned onto a cargo deck of a cargo aircraft. At least one anti-rattle device is operatively associated with the load platform for positionally fixing the load platform to a tie-down ring of the cargo deck of a cargo aircraft. The cargo load platform may support a rigid fuel tank thereon so that auxiliary fuel tankage systems can be provided as may be needed.

20 Claims, 17 Drawing Sheets

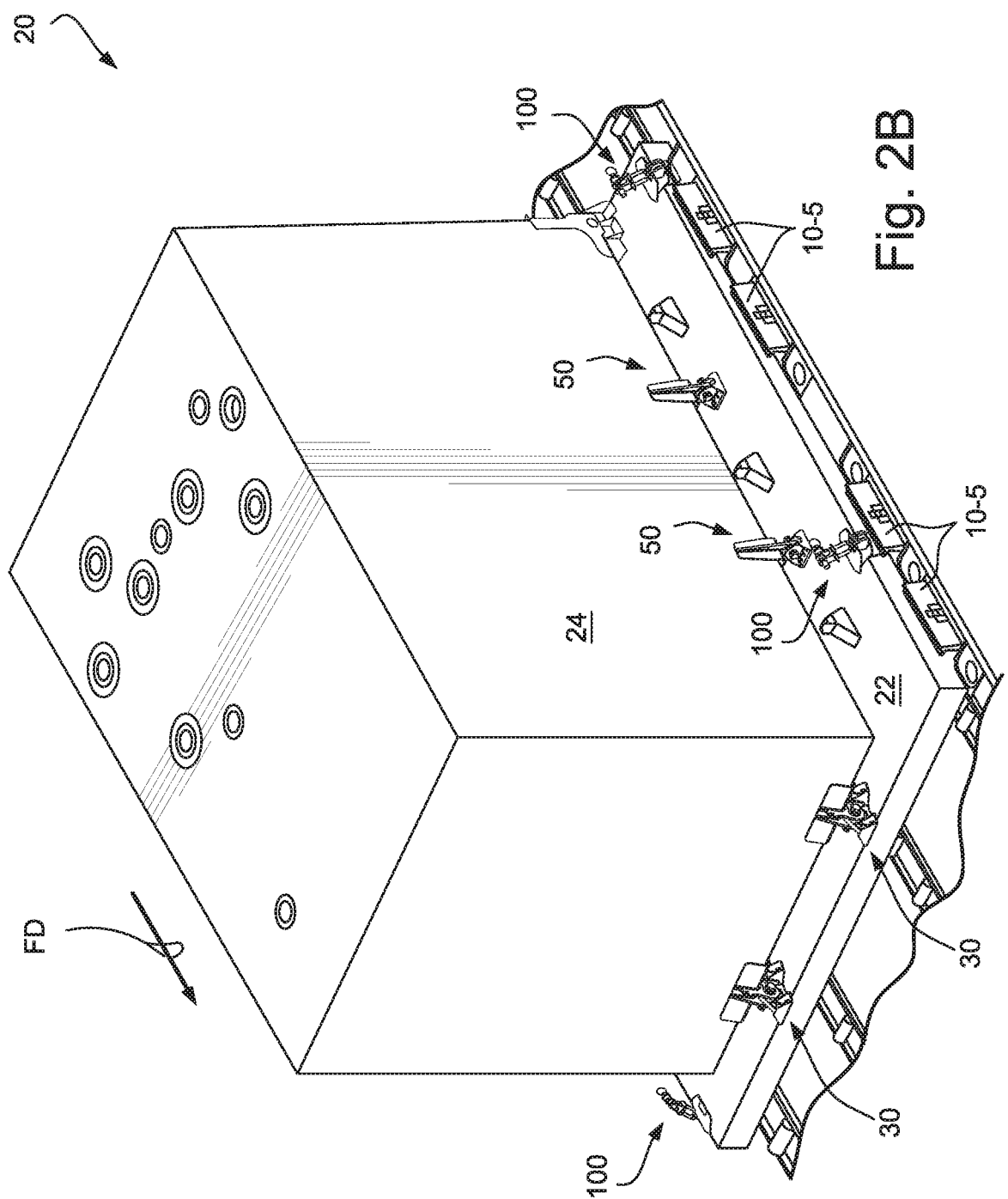

AIRCRAFT CARGO PLATFORM ASSEMBLIES AND AIRCRAFT MODULAR AUXILIARY FUSELAGE FUEL TANK SYSTEMS EMPLOYING THE SAME

FIELD

The embodiments disclosed herein relate generally to cargo load pallets which are especially adapted to provide support for auxiliary aircraft fuel systems. Certain embodiments disclosed herein more specifically relate to assemblies and systems whereby additional fuel tank assemblies may be removably installed in the cargo area of an aircraft fuselage.

BACKGROUND

Commercial, military transport or tanker aircraft are typically designed to carry a given load of passengers, cargo or both, at a given range and/or at a given endurance. Depending on the type of mission assigned to the aircraft, the range and/or endurance, or simply, the quantity of fuel onboard an aircraft may need to be increased. Such increase can be accomplished by installing additional or auxiliary fuel tank systems in the aircraft.

Conventional auxiliary fuel tank systems are typically comprised of additional fuel tanks and their respective equipment, manifolds, and harnesses necessary to manage the additional fuel carried in the tanks. These additional fuel tanks and systems could come in diverse configurations, for example, with tanks installed under the wings, external to the aircraft or with tanks installed internal to the fuselage. These additional fuel tanks and systems could be configured to directly supply fuel to the engines or to transfer the fuel to other on-board dedicated fuel tanks and from there to feed the aircraft engines or be used to control the aircraft's center of gravity or even to transfer fuel to other aircraft, in flight or to other vehicles, on the ground.

Whatever the reasons to install these additional tanks and systems, the paramount requirement is that they should be practical to the aircraft operator. Thus, additional tanks and systems which complement an aircraft's main tanks should be relatively simple to install/remove, and integrate into the basic aircraft fuel system.

However, most known auxiliary fuel tanks, especially those installed in the cargo compartment of an aircraft fuselage, can be difficult to install or remove rapidly, due to their size and weight. Another concern is related to the fixation method as some auxiliary fuel tanks need to have dedicated rails and/or fixations installed on the aircraft fuselage which in turn compromises available cargo space thereby leading to more complex installation procedures. As a result, the mission availability of the aircraft will be significantly impaired in case of reconfiguration.

Several types of auxiliary fuel tank systems are known (e.g., by U.S. Pat. Nos. 6,889,940; 8,851,424; and 9,963,030, the entire contents of each such patent being expressly incorporated hereinto by reference) which include auxiliary fuel tanks installed in a fuselage of an aircraft. These known systems are typically composed of one or a plurality of fuel tanks positioned adjacent to one another, along a longitudinal axis of the aircraft and connected by fuel lines between each other and connected to the aircraft's main fuel lines or main fuel tanks. Although these known proposals are removable from the aircraft's cargo compartment, they nonetheless require a series of auxiliary equipment, several tools and delicate maneuvering of the tanks in order to be removed/installed without damage to the fuel tanks and/or aircraft. As a result, the aircraft's mission availability is reduced in case of cargo space reconfiguration or tank maintenance.

Another known type of auxiliary fuel tank system relates to portable fuel tank units composed of fuel containers placed on top of pallets as disclosed in U.S. Pat. No. 9,873,519 (the entire content of which is expressly incorporated hereinto by reference). The fuel tanks provided by such prior proposed auxiliary fuel tankage system includes rollers or other wheeled components to thereby allow the tanks to roll into the cargo area of an aircraft fuselage. Once in the cargo area of the aircraft fuselage, the auxiliary fuel tanks are connected by fuel lines between each unit (in cascade) and connected to the aircraft main tank(s). Although the known proposed system is easier to place within the aircraft fuselage as compared to other proposals known in the art as described above due to the provided rolling capabilities, it nonetheless has to be connected in cascade. Therefore the auxiliary fuel units do not operate independently since the contained auxiliary fuel has to always flow through the first unit that is connected to the aircraft's main fuel tank. This cascade configuration in turn leads to a lower flexibility for auxiliary fuel tank configurations inside the cargo area. Furthermore, no proposal is provided as to how the rollably configured tanks are to be fixed within the fuselage. Any fixation method for removable auxiliary fuel tanks will self-evidently play an important role since operatively providing the fuel tank units with rollers will make the system naturally unstable and may lead to undesired vibrations experienced by the aircraft's airframe and/or the auxiliary fuel tanks. The setup time for any fixation method is also of relevant importance since it impacts directly the aircraft's mission availability and reconfiguration time.

It would therefore be desirable if aircraft auxiliary fuel tank units could be easily installed/removed from an aircraft's fuselage with minimal aircraft down time, while at the same time being reliably positionally fixed to the aircraft's airframe structures during use. It is towards providing such a need that the embodiments disclosed herein are directed.

SUMMARY

The embodiments disclosed herein are directed generally toward cargo load platform assemblies which are especially adapted to provide support for a variety of cargo, such as auxiliary aircraft fuel tanks. According to certain embodiments herein, a load platform is provided which is adapted to being positioned onto a cargo deck of a cargo aircraft. At least one anti-rattle device is operatively associated with the load platform for positionally fixing the load platform to a tie-down ring of the cargo deck of a cargo aircraft. The cargo load platform may support a rigid fuel tank thereon so that auxiliary fuel tankage systems can be provided as may be needed.

According to certain embodiments, the at least one anti-rattle device will include an upper connector having one end pivotally attached to the load platform and a threaded shaft extending axially therefrom, a lower clevis connector having a threaded shaft extending therefrom in coaxial alignment with the threaded shaft of the upper connector, a turnbuckle connector connecting the coaxially aligned threaded shafts of the upper connector and lower clevis connector; and a primary quick-disconnect pin removably inserted in the lower clevis connector so as to be engaged with the tie-down ring of the cargo deck when the anti-rattle device is pivotally moved into an operative position.

The clevis connector of the anti-rattle device may include an outwardly extending boss defining a boss aperture while the turnbuckle connector may include a flange defining a series of circumferentially spaced-apart flange apertures capable of being brought into alignment with the boss aperture upon turning movement of the turnbuckle connector. A secondary quick-disconnect pin capable of being inserted in a respective one of the flange apertures and the boss aperture when aligned will therefore prevent turning movement of the turnbuckle connector (which could loosen the secure attachment of the load platform to the cargo ramp of the cargo aircraft).

When employed as a load platform for an auxiliary fuel tank, a plurality of tank connection assemblies may be provided so as to provide reliable yet removable positional fixation between the auxiliary fuel tank and the load platform. In this regard, the tank connection assemblies may include an upper fitting rigidly connected to the fuel tank and a lower fitting rigidly connected to the load platform and pivotally connected to the upper fitting. One of the upper and lower fittings may have a pair of separated first fitting bosses, while the other of the upper and lower fittings may have a second fitting boss received between and pivotally connected to the first fitting bosses. The upper fitting may for example include an angle support rigidly attached to at least one wall of the fuel tank.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

FIGS. 2A and 2B are a more detailed rear and front and perspective views, relative to the aircraft's flight direction, of an exemplary modular auxiliary fuel tankage system as depicted in FIG. 1;

FIG. 3 is a perspective view thereof, FIG. 4 is a top plan view thereof, FIG. 5 is a left side elevational view thereof, and FIG. 6 is an end elevational view thereof;

DETAILED DESCRIPTION

Figure 1:
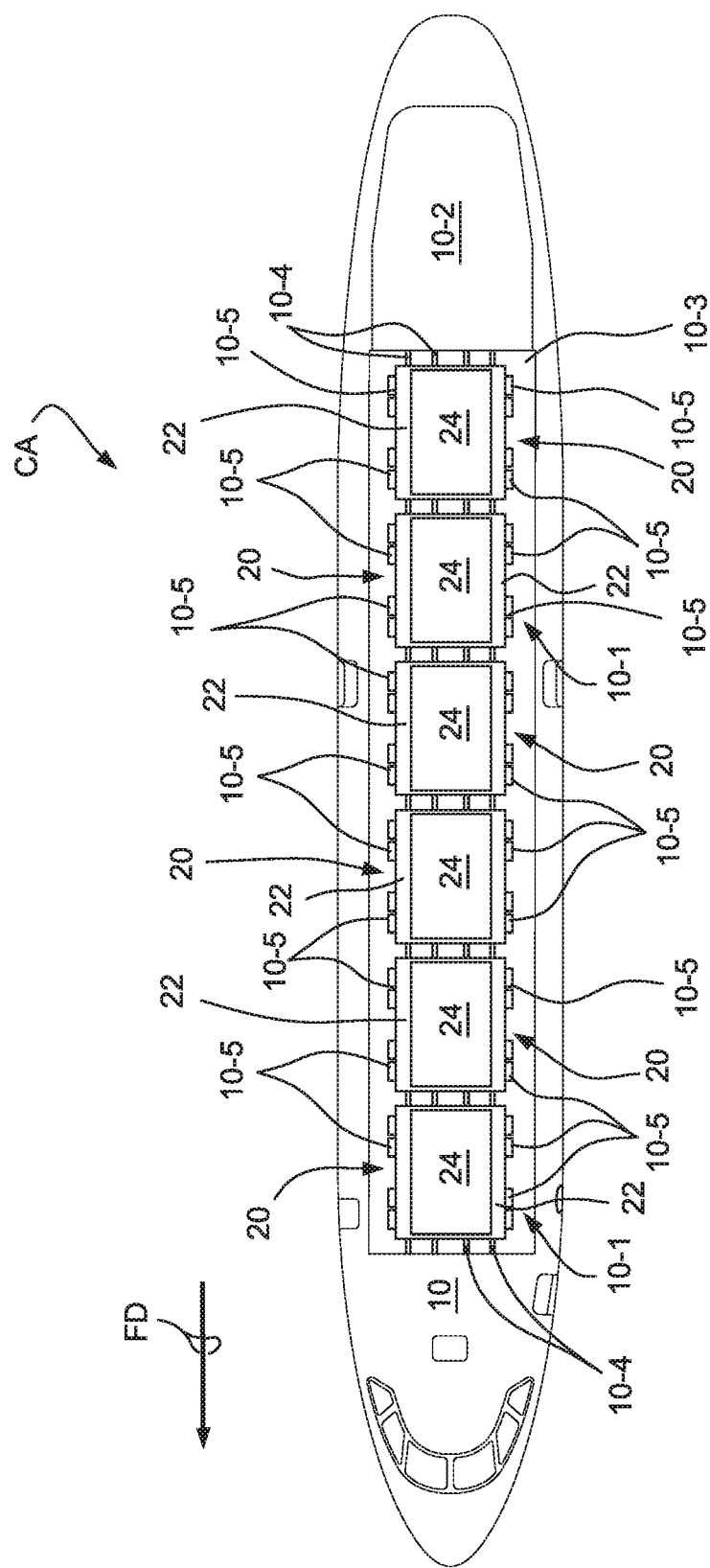
FIG. 1 is an x-ray plan view of a cargo aircraft fuselage which includes a plurality of modular auxiliary fuel tankage systems in accordance with an embodiment of the invention.

Accompanying FIG. 1 depicts an x-ray plan view of an exemplary interior cargo compartment 10-1 within the fuselage 10 of a conventional cargo aircraft CA. As shown, the cargo aircraft CA is provided with a rear-entry cargo door/ramp 10-2 and a cargo deck 10-3 which supports a number of modular cargo load platform assemblies 20 in accordance with an embodiment of the invention. The cargo deck 10-3 conventionally includes a series of laterally spaced apart roller equipped guide rails 10-4 aligned in the flight direction (arrow FD) of the aircraft CA for guiding the individual modular cargo load platform assemblies 20 into the selected position within the cargo compartment 10-1. As is known, access to the cargo compartment 10-1 may be achieved through the cargo door/ramp 10-2 when in a lowered position so as to allow the individual modular auxiliary fuel tankage systems to be loaded/unloaded from the cargo aircraft CA by suitable cargo handling equipment.

Figure 2A:
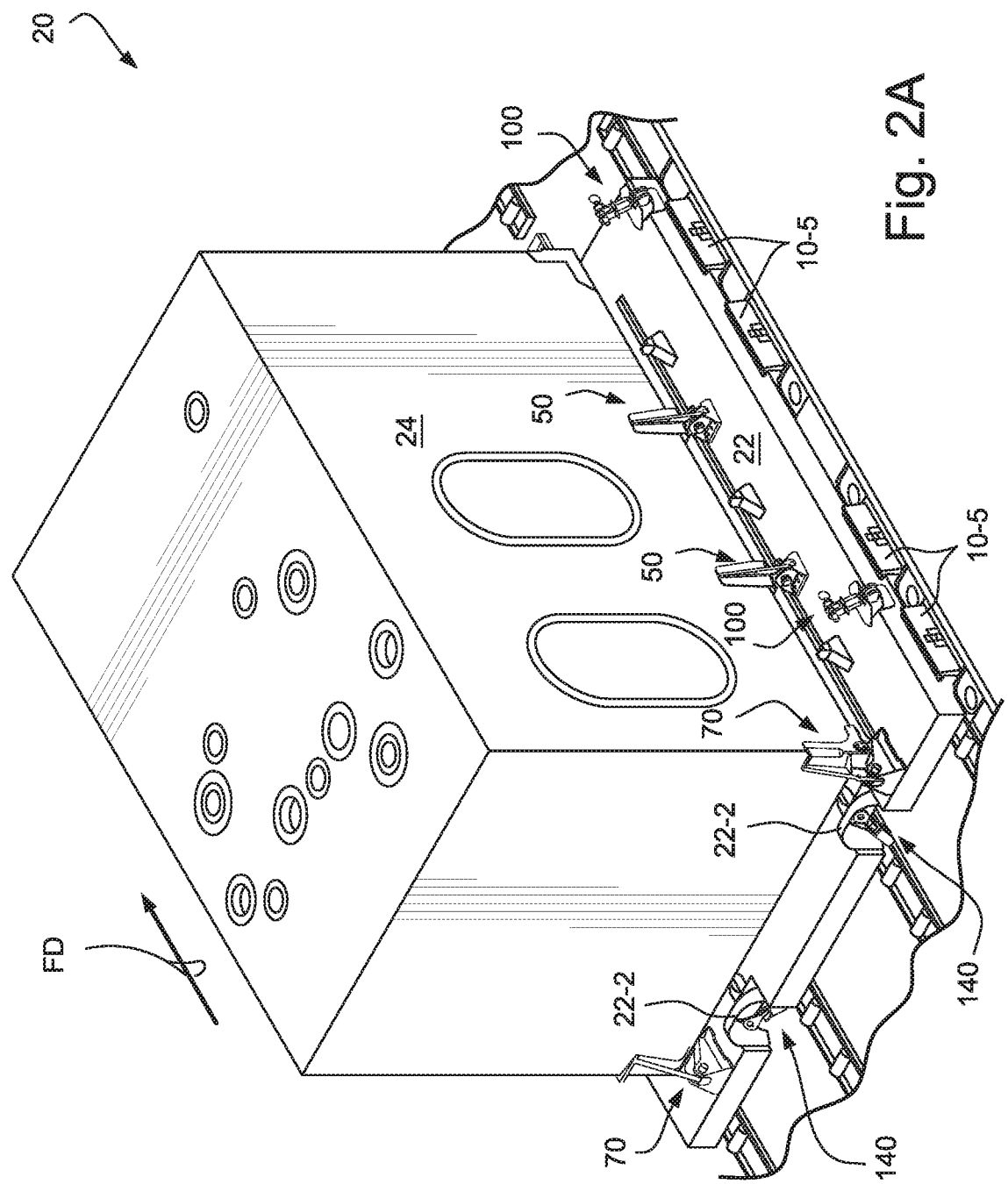
Figure 3:
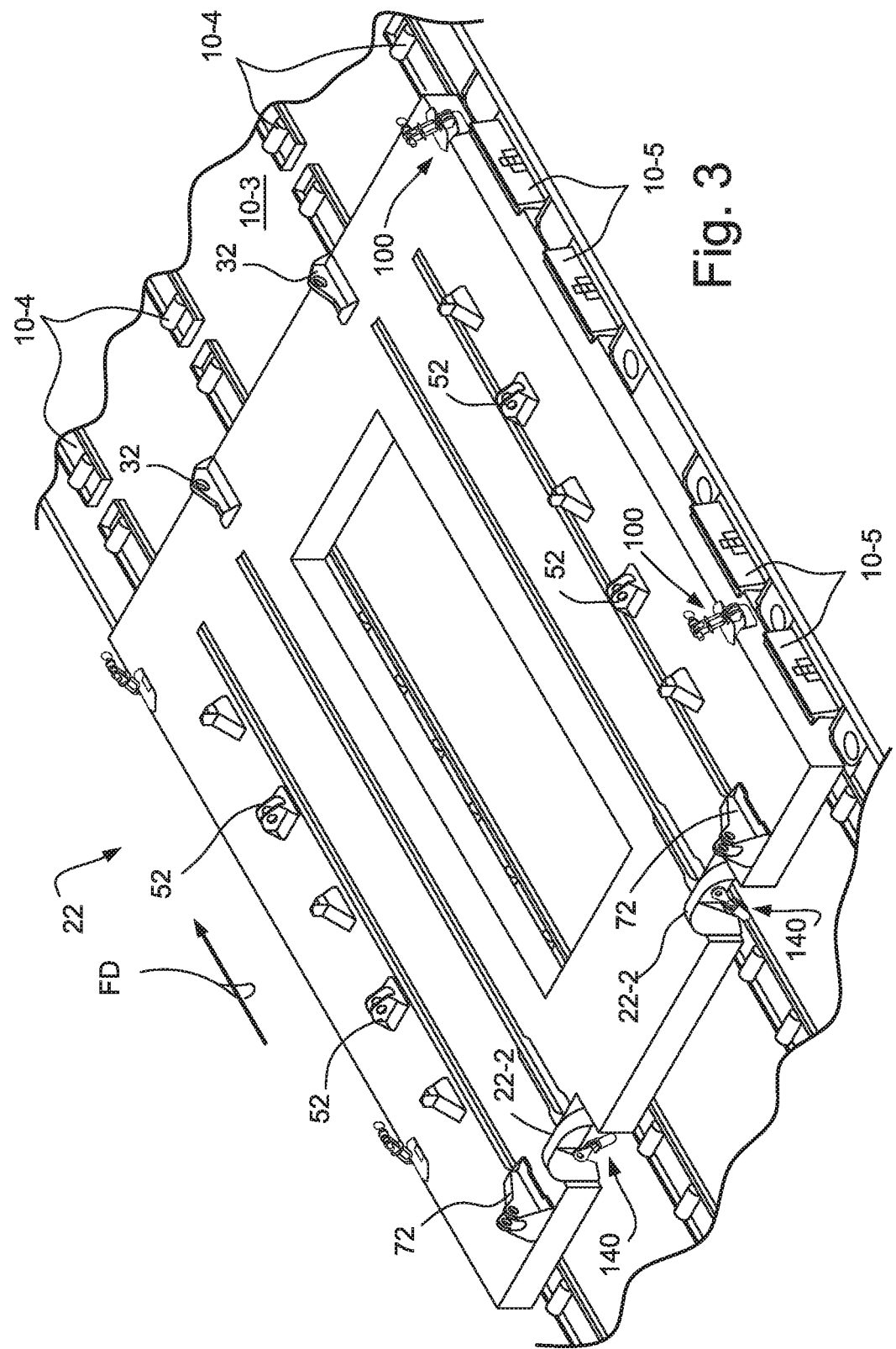
FIGS. 3-6 are detailed views of a load platform that may be employed in the modular auxiliary fuel tankage systems of the embodiment described herein, where
Figure 4:
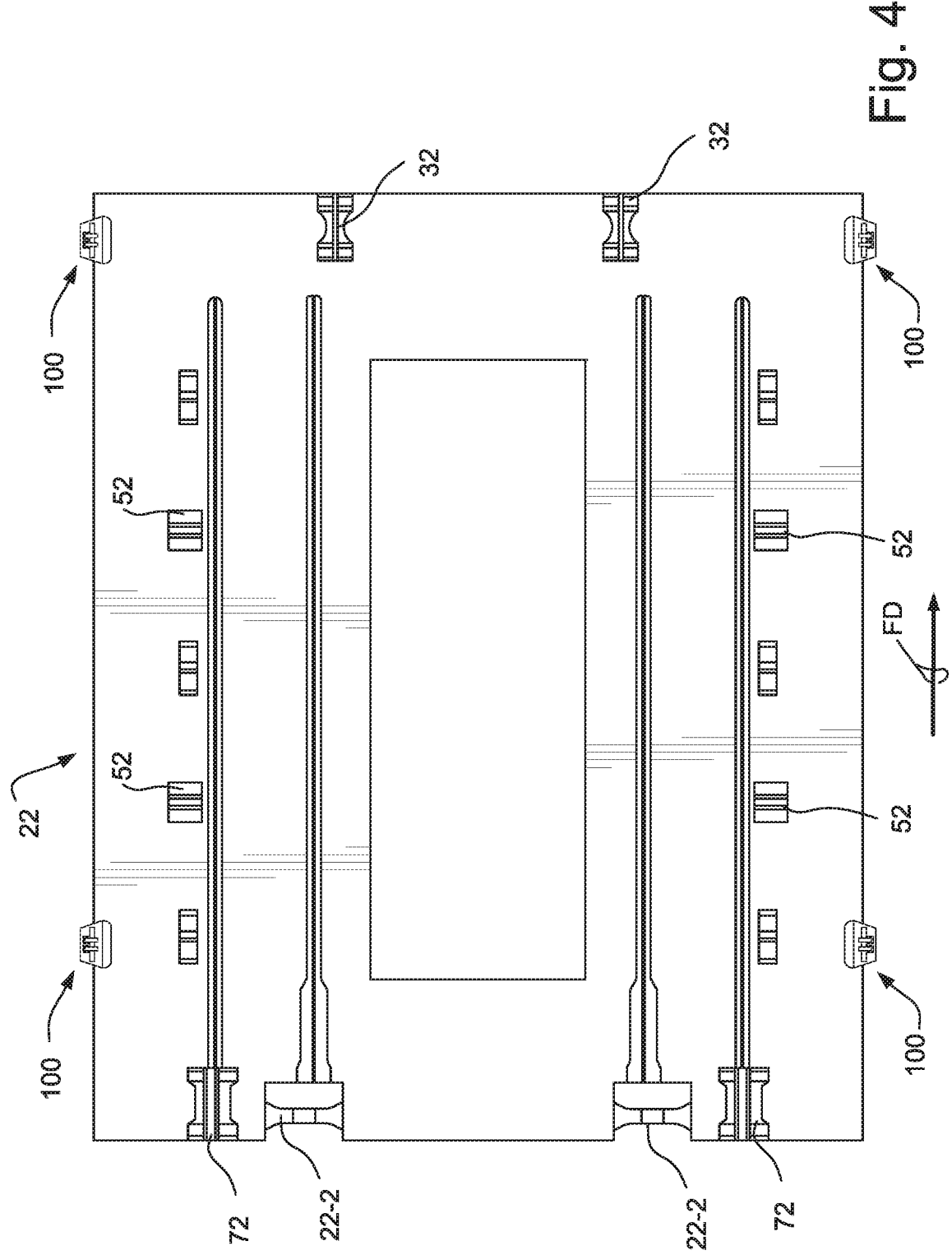
Figure 5:
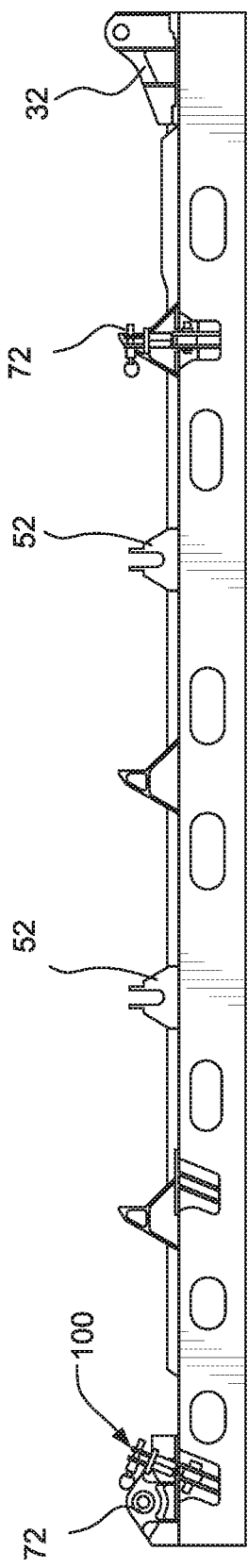
Figure 6:
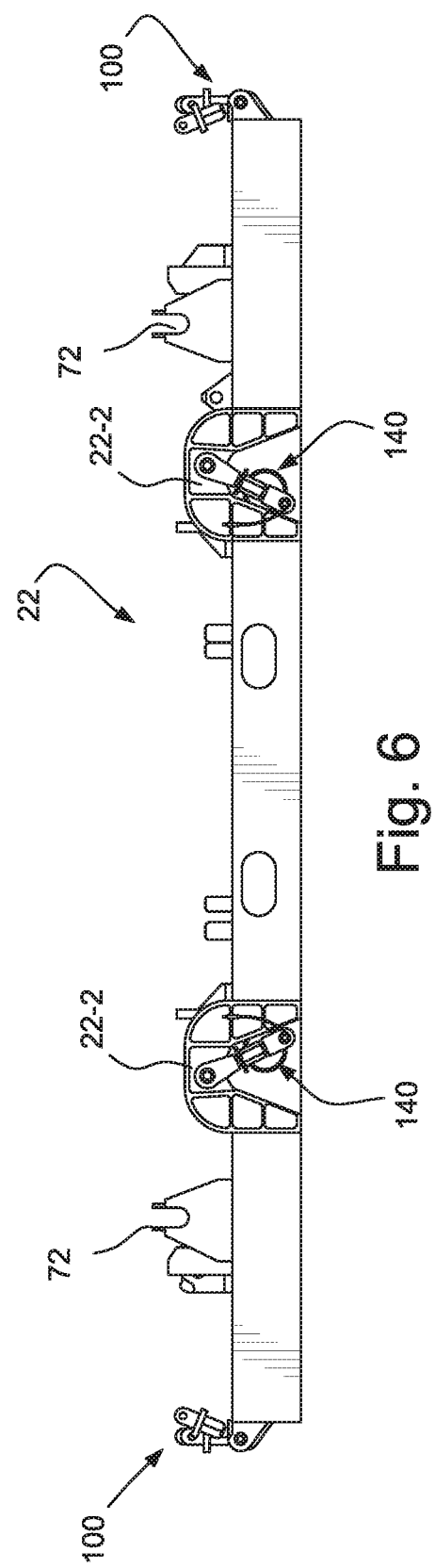

As is perhaps better shown in FIGS. 2A and 2B, the modular cargo load platform assemblies 20 when employed as auxiliary fuel tankage systems are generally comprised of a load platform 22 and a rigid auxiliary fuel tank 24 supported by the load platform. Once positioned on the cargo deck 10-1, the modular cargo load platform assemblies 20 may be positionally fixed to the cargo deck 10-1 by way of conventional pallet locks 10-5 that are capable of being engaged with a lateral flange element associated with the load platform 22. The fuel tanks 24 are in turn rigidly connected to the load platforms 22 by way of a series of front, lateral and aft tank connection assemblies 30, 50 and 70, respectively, relative to the direction of flight depicted by the arrow FD in several of the drawing Figures.

The fuel tanks 24 are most preferably in the form of a rigid double-walled rectangular fuel container having access ports and attachment fittings to allow the interconnection of the fuel tanks 24 with one another and/or with the on-board fixed fuel capacity (e.g., wing mounted fuel tanks) associated with the aircraft CA. Access windows and/or doors could also be provided in the fuel tanks to allow visual inspection of the fuel quantity and/or access for maintenance of the tank and its associated fitting components.

An exemplary load platform 22 is shown in greater detail in FIGS. 3-6. The load platform 22 is preferably sized and configured to conform to the external dimensions of a standard Type I military pallet (e.g. 108 inches×88 inches) so it can readily be accommodated within conventional military cargo aircraft. As shown in FIGS. 3-6, the load platform 22 will integrally include the lower attachment fittings 32, 52 and 72 associated with the front, lateral and rear connection assemblies 30, 50 and 70 to be described in greater detail below positioned at the front, lateral and rear sides, respectively, of the fuel tank 22. In addition, the load platform will include opposed forward and aft pairs of lateral anti-rattle devices 100 to be described in greater detail below positioned at forward and aft locations along the opposed lateral sides of the load platform 24, respectively, and a pair of rear anti-rattle devices 140 positioned along a rear side of the load platform 24.

Figure 7:
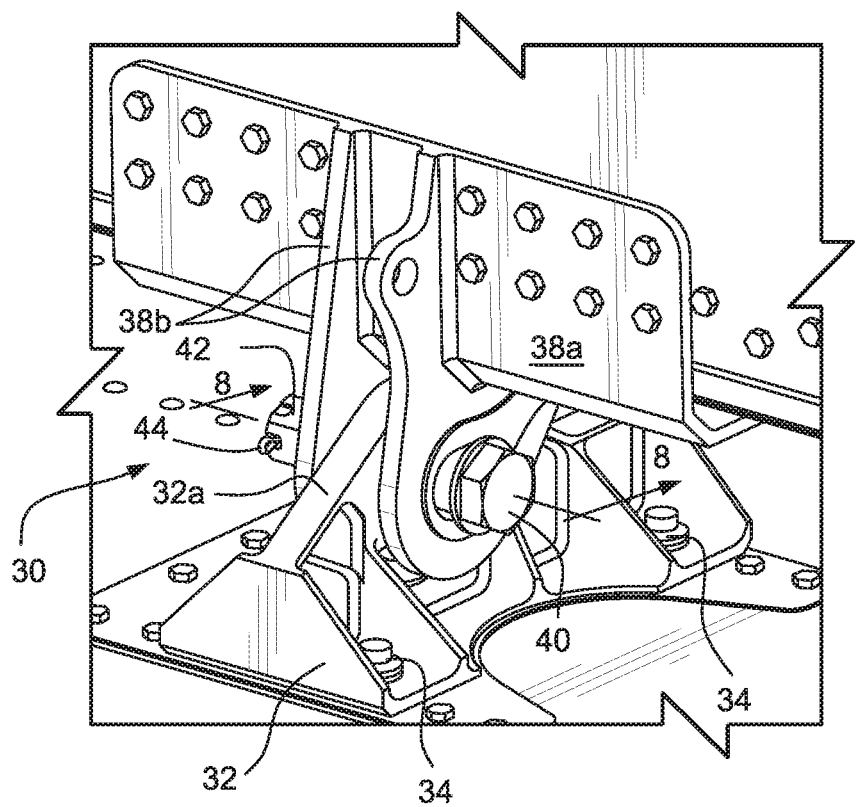
FIG. 7 is a detailed perspective view of a representative front fitting assembly to connect the fuel container to the load platform.
Figure 8:
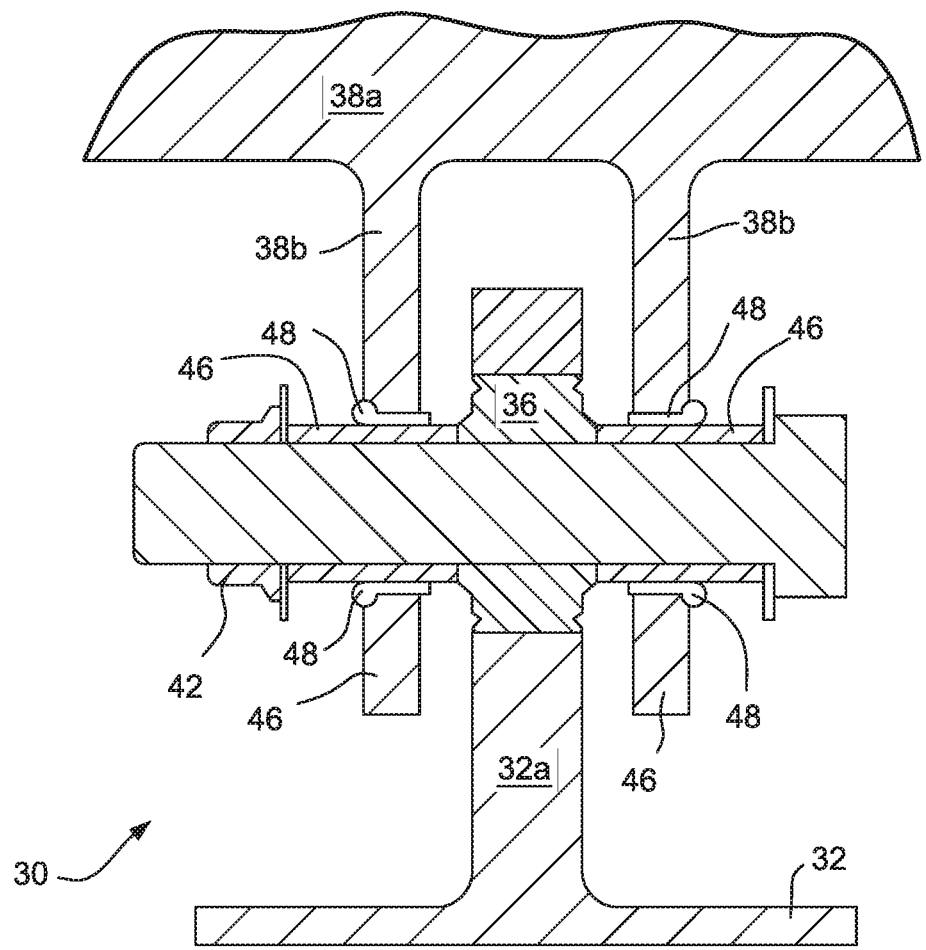
FIG. 8 is a cross-sectional elevational view of the representative front fitting assembly shown in FIG. 7 as taken along lines 8-8 therein.

The front tank connection assembly 30 is shown in greater detail in FIGS. 7 and 8. The lower fitting 32 of the assembly 30 is rigidly yet removably connected to the load platform 22 by bolt and nut assemblies 34. The fitting 32 has an upwardly extending fitting boss 32a which includes an integrated bearing member 36 (see FIG. 8). The upper fitting 38 includes an angle support 38a which is rigidly connected to the fuel tank 24 by any suitable means, e.g., bolts, screws, welding or the like. A pair of downwardly projecting fitting bosses 38b defining respective openings are rigidly coupled (e.g., via welding) to the angle support 38a and define therebetween a suitable dimension for accepting the fitting boss 32a of the lower fitting 32 such that the opening in the lower fitting boss 32a is aligned with the openings of the fitting bosses 38a. Connection between the lower and upper fitting bosses 32a, 38a, respectively, is provided by a conventional threaded bolt 40 and castellated nut 42, the latter being secured to the former by a conventional cotter pin 44 extending through an aperture in the shaft of the bolt 40. Cylindrical slide bushings 46 and shoulder bushings 48 may be provided so as to facilitate connection of the bosses 32a and 38a.

Figure 9:
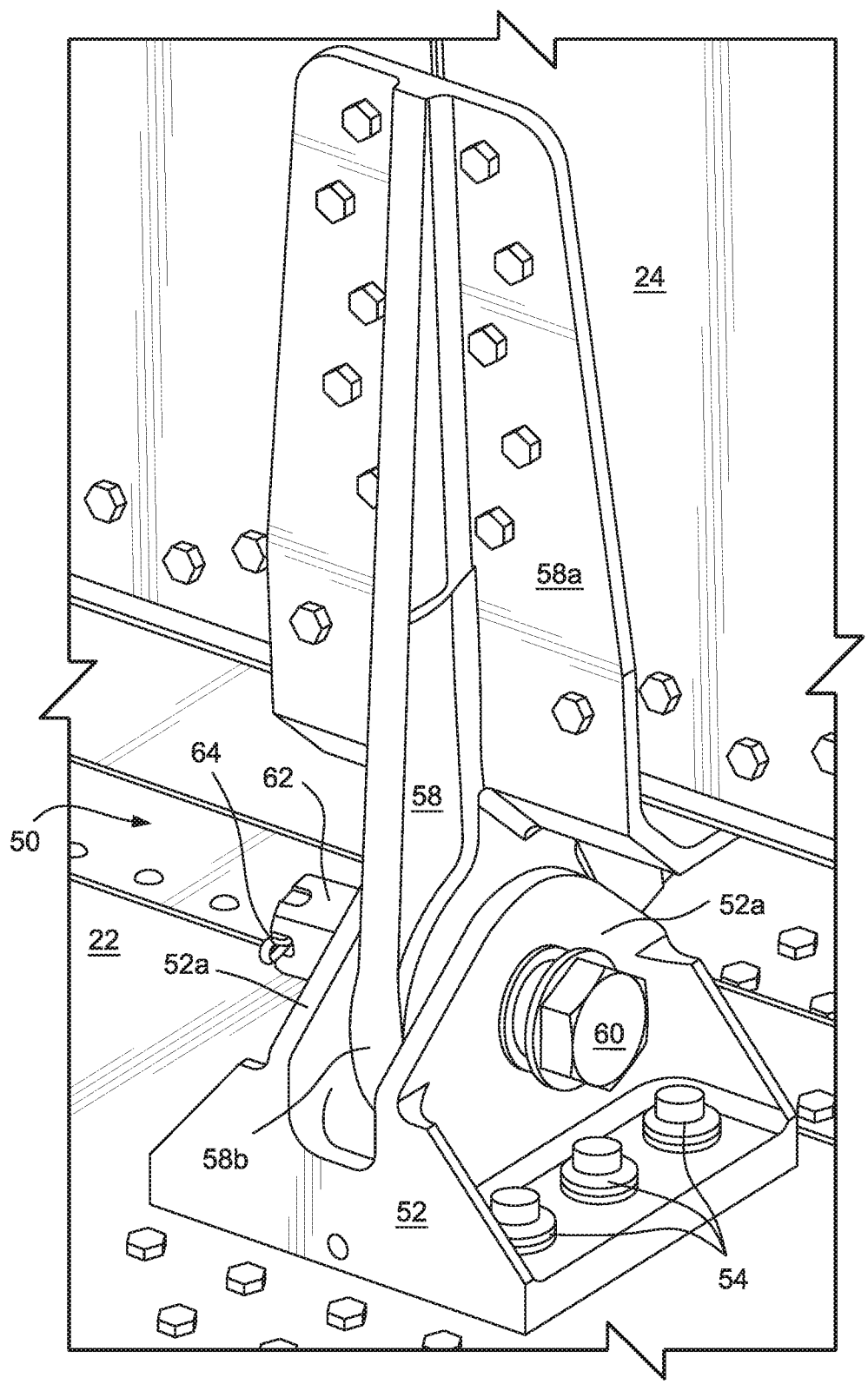
FIGS. 9-10 are detailed perspective views of representative left and right side lateral fitting assemblies, respectively, that connect the fuel container to the load platform.
Figure 10:
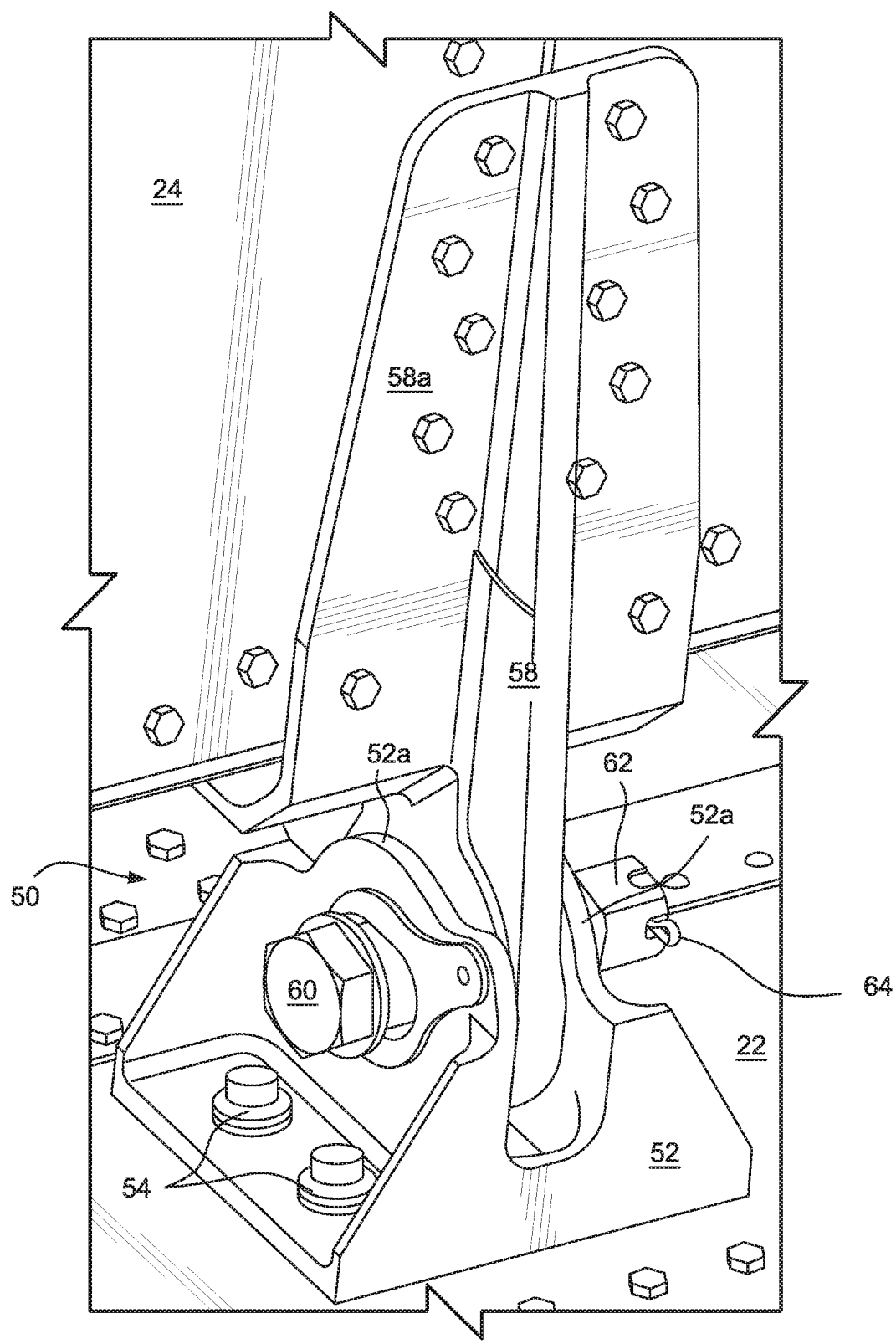

Substantially mirror image left and right side lateral connection assemblies 50 are shown in FIGS. 9 and 10, respectively. As shown, each of the connection assemblies 50 includes a lower fitting 52 that is rigidly yet removably connected to the load platform 22 by bolt assemblies 54. The lower fitting 52 has upwardly extending pairs of fitting bosses 52a defining aligned openings. The upper fitting 58 includes an angle support 58a which is rigidly connected to the fuel tank 22 by any suitable means, e.g. rivets, bolts, screws, welding or the like. A downwardly projecting fitting boss 58b defining an opening is rigidly coupled (e.g., via welding) to the angle support 58a. The lower fitting bosses 52a are separated from one another so as to define therebetween a suitable dimension for accepting the fitting boss 58a of the upper fitting 58 such that the openings in the lower fitting boss 52a are aligned with the opening of the fitting boss 58a. Connection between the lower and upper fitting bosses 52a, 58a, respectively, is provided by a conventional threaded bolt 60 and castellated nut 62, the latter being secured to the former by a conventional cotter pin 64 extending through an aperture in the shaft of the bolt 54a.

Figure 11:
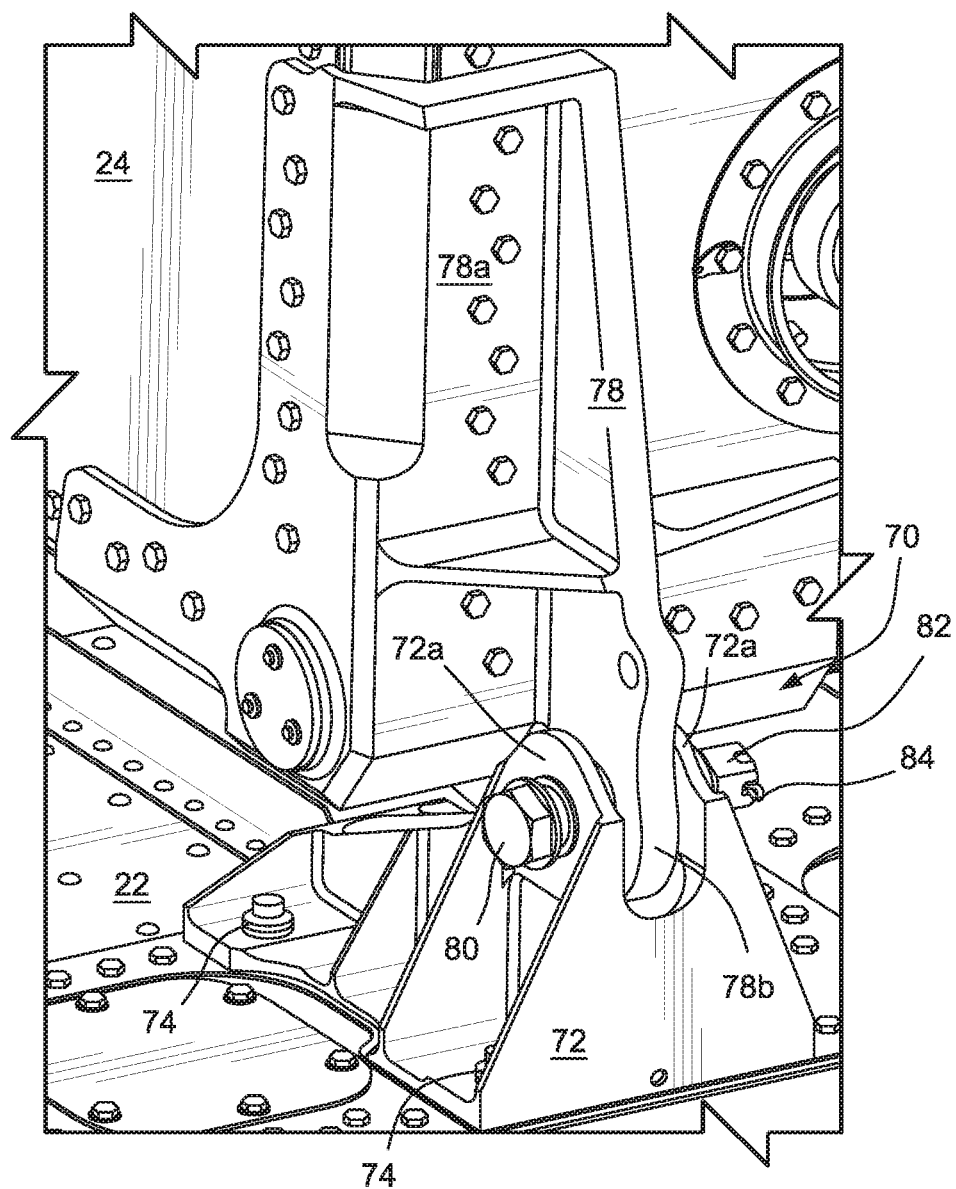
FIG. 11 is a detailed perspective view of a representative rear fitting assembly to connect the fuel container to the load platform.

A representative rear connection assembly 70 is shown in FIG. 11. As shown, the rear connection assembly 70 includes a lower fitting 72 that is rigidly yet removably connected to the load platform 22 by bolt and nut assemblies 74. The lower fitting 72 has upwardly extending pairs of fitting bosses 72a defining aligned openings. The upper fitting 78 includes a corner angle support 78a which is rigidly connected to mutually perpendicular sides and bottom panels of the fuel tank 24 by any suitable means, e.g. rivets, bolts, screws, welding or the like. A downwardly projecting fitting boss 78b defining an opening is rigidly coupled (e.g., via welding) to the angle support 78a. The lower fitting bosses 72a are separated from one another so as to define therebetween a suitable dimension for accepting the fitting boss 78a of the upper fitting 78 such that the openings in the lower fitting boss 72a are aligned with the opening of the fitting boss 78a. Connection between the lower and upper fitting bosses 72a, 78a, respectively, is provided by a conventional threaded bolt 80 and castellated nut 82, the latter being secured to the former by a conventional cotter pin 84 extending through an aperture in the shaft of the bolt 80.

Figure 12:
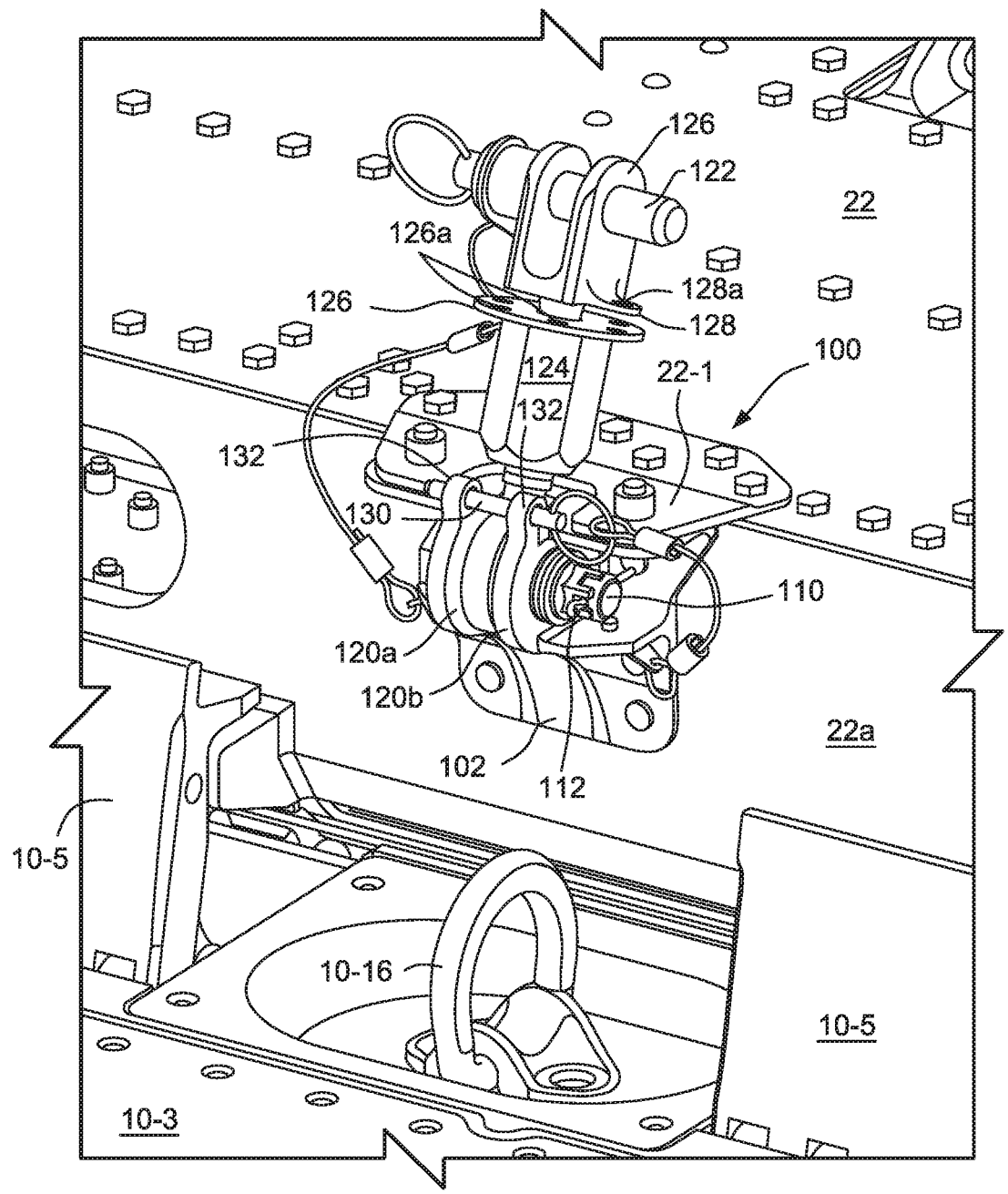
FIGS. 12-13 depict a representative lateral anti-rattle device associated with the load platform depicted in stowed and engaged positions, respectively.
Figure 13:
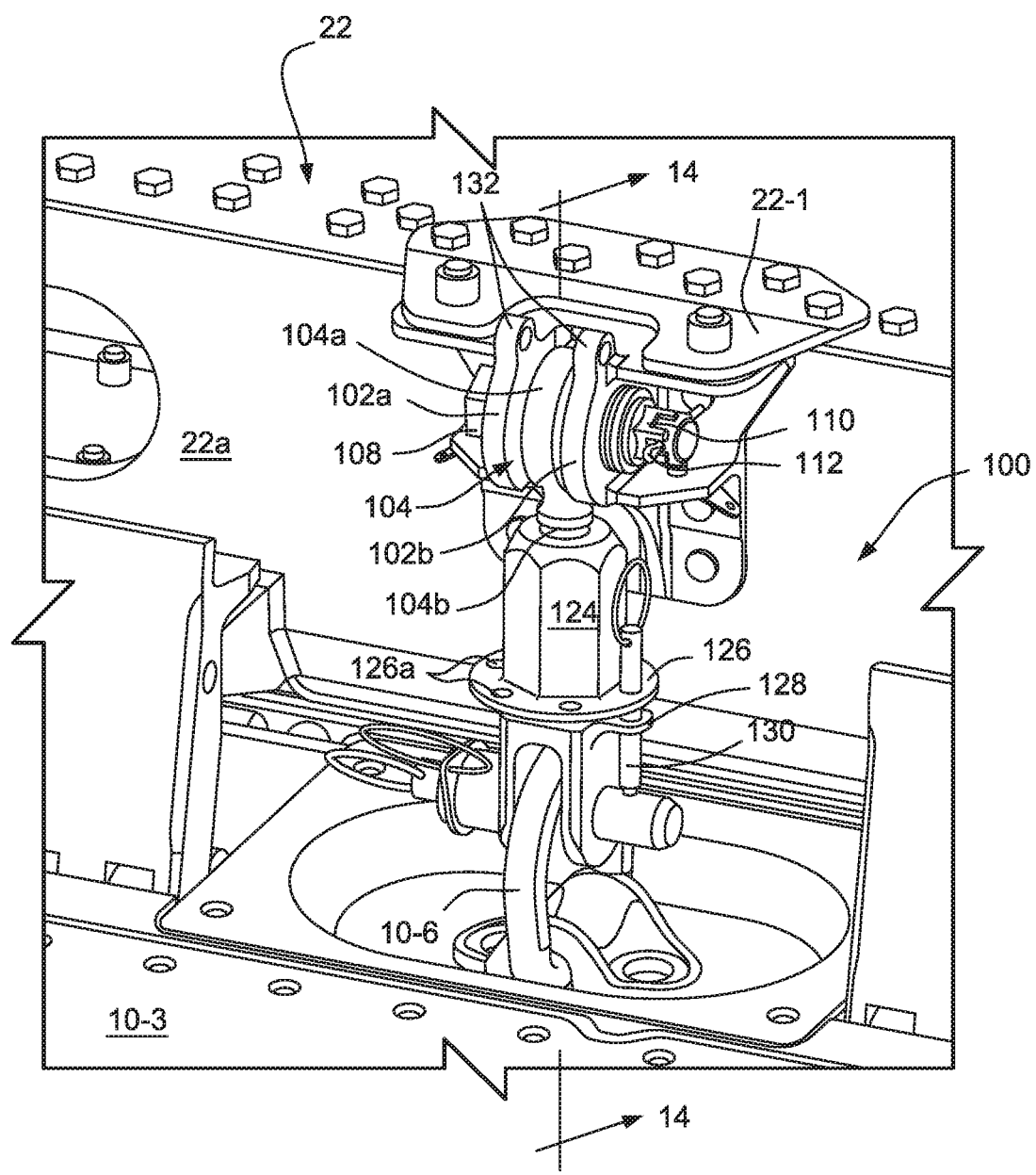
Figure 14:
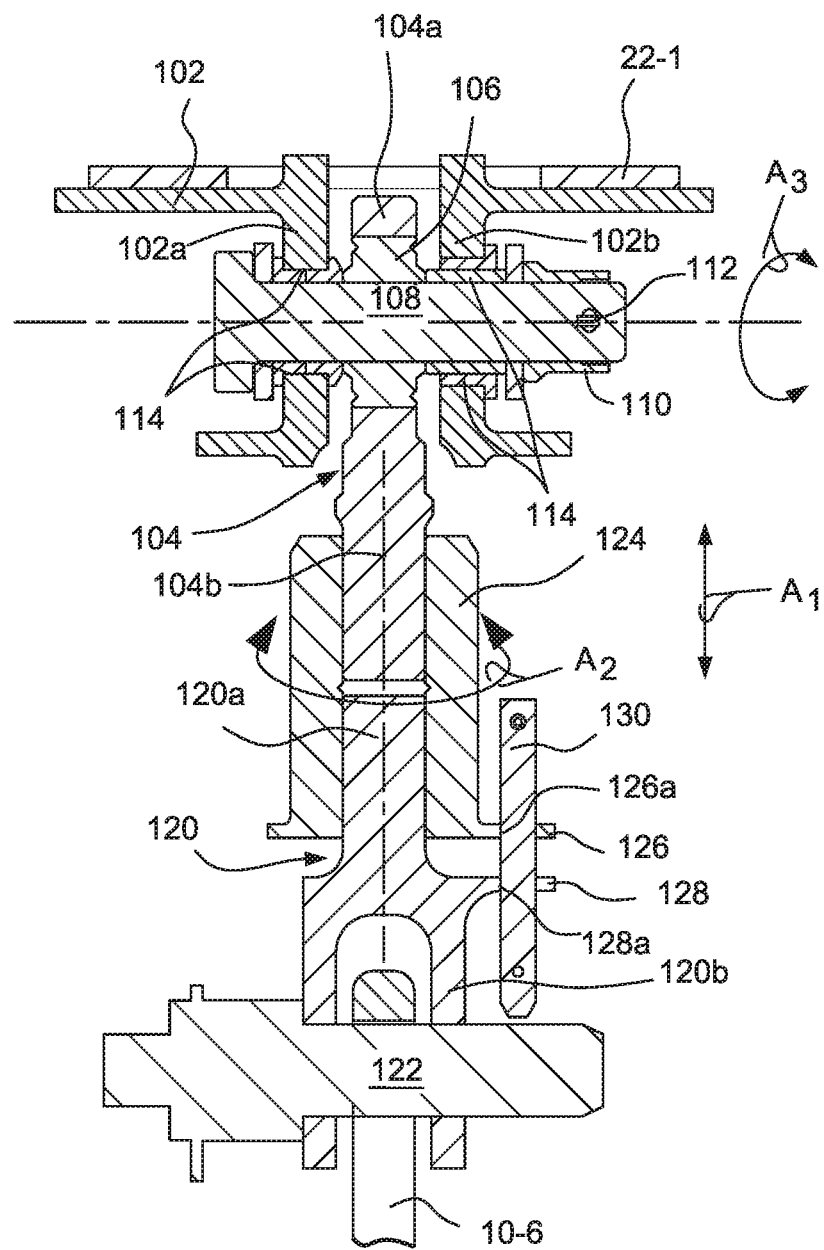
FIG. 14 is a cross-sectional elevational view of the representative lateral anti-rattle device in an engaged position as taken along lines 14-14 in FIG. 13

A representative lateral anti-rattle device 100 is depicted in greater detail in FIGS. 12-14. In this regard, it will be observed that the device 100 includes a support fitting 102 that is rigidly connected to a lateral side 22a of the load platform 22 and a lateral connection flange 22-1 extending outwardly from the side 22a. The support fitting 102 includes a pair of separated apertured connection lobes 102a, 102b. An upper connector 104 is provided having an upper eyelet end 104a which is positioned between the separated apertured connection lobes 102a, 102b and a lower threaded shaft 104b extending from the eyelet 104a. The support fitting 102 includes a bearing 106 integrated in the eyelet bolt 104, the bearing 106 having an opening aligned with the eyelet end 104a of the eyelet bolt 104. A threaded bolt 108 extends through the openings of the connection lobes 102a, 102b and the bearing 106 aligned therewith and is secured by a castellated nut 110 and cotter pin 112. Suitable shoulder bushings 114 are provided so as to allow pivotal movement of the eyelet bolt 104 about the axis of the threaded bolt 108 (arrow $A_3$ as shown in FIG. 14) between the stowed condition as shown in FIG. 12 and the operative condition as shown in FIG. 13.

A lower connector 120 includes an upper threaded shaft 120a which is oppositely threaded relative to the threaded shaft 104b of the upper connector 104 and terminates in an apertured clevis member 120b. A primary quick-release pin 122 is sized and configured so as to extend through the apertures of the clevis member 120b.

A turnbuckle connector 124 threadably couples the oppositely threaded shafts 104b and 120a of the upper and lower connectors 104, 120, respectively. As shown, the exterior surface of the turnbuckle connector 124 is provided with a series of planar surfaces forming a hexagonal perimeter to allow a turning tool (wrench) to be applied to the connector 124 and assist in its turning movement about the elongate axis of the device 100 (arrow $A_2$ in FIG. 14) so as to effectively increase or decrease the effective dimension between the parallel axes of the threaded bolt 108 and the quick release pin 122 (arrow $A_1$ in FIG. 14), i.e., in the manner of a turnbuckle connection.

In use, device 100 can be pivoted about the axis of the bolt 108 between the stowed condition shown in FIG. 12 to the operative condition shown in FIG. 13 to allow the clevis member 120b to receive therein the positionally fixed tie-down ring 10-6 associated with the cargo deck 10-1. The turnbuckle connector 124 may then be turned in one direction to increase the effective length of the device 100 to allow the quick release pin 122 to extend through each of the openings of the clevis member 120b and through the tie-down ring 10-6. Thereafter, the application of reverse turning movement applied to the turnbuckle connector 124 will effectively shorten the length of the device 100 to thereby exert tension through the device 100 between the load platform 20 and the tie-down ring 10-6 thereby securely fixing the position of the load platform 20 to the cargo deck 10-1.

It will be observed that the turnbuckle connector 124 includes a lower flange 126 having a series of circumferentially spaced apart apertures 126a. The clevis member 120b includes an outwardly extending boss 128 which defines an aperture 128a that is capable of being in registered alignment with one of the apertures 126a of the turnbuckle connector 124. A secondary quick release pin 130 may therefore be inserted through such apertures 126a, 128a when in registered alignment with one another to prevent turning movement of the turnbuckle connector 124 which in turn could loosen the tensioned connection with the tie-down ring 10-6. While in the stowed condition as depicted in FIG. 12, the secondary quick release pin 130 may be extended through the apertures formed in bosses 132 associated with the lobes 102a, 102b. The device 100 will therefore be maintained in the stowed condition as shown in FIG. 12 with the pin 130 engaged with the apertures of the bosses 132, but may be removed from such apertures of bosses 132 to thereby allow the device 100 to then be pivoted into the operative position as depicted n FIG. 13.

The rear anti-rattle devices 140 are provided for the similar positional fixation purpose for the load platform 22 and hence the fuel tank 20 supported thereby as the lateral anti-rattle devices 100 described above. A representative rear anti-rattle device 140 is depicted in accompanying FIGS. 15-17. It will be observed in this regard that the rear anti-rattle device is operatively connected to an inverted U-shaped fitting 22-2 at the rear side 22b of the load platform 22. The device 140 includes oppositely oriented upper and lower clevis connectors 142a, 144a which include axially opposed threaded shafts 142b, 144b that are threadably coupled to one another by a turnbuckle connector 146. The shafts 142b, 144b include opposite threads so that when turning movement is applied to the turnbuckle connector 146 (arrow $A_5$ in FIG. 17), e.g., by application of a turning tool (wrench) to the external hexagonal surfaces thereof, the effective length of the device 140 can be increased or decreased (arrow $A_4$ in FIG. 17) in dependence upon the turning direction applied to the turnbuckle connector 146 thereby exerting an axial tension force between the clevis connectors 142a, 144a.

Figure 15:
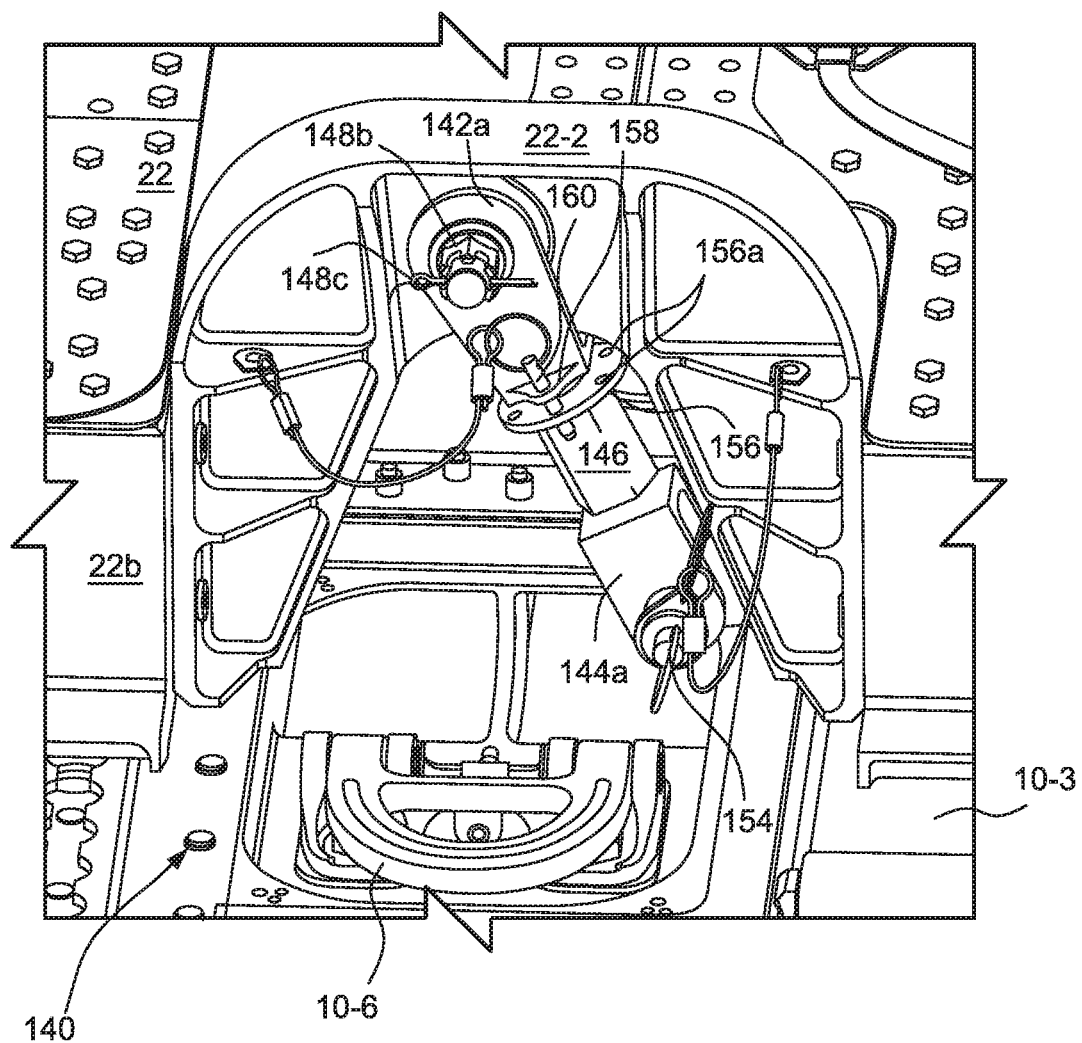
FIGS. 15-16 depict a representative end anti-rattle device associated with the load platform depicted in stowed and engaged positions, respectively.
Figure 16:
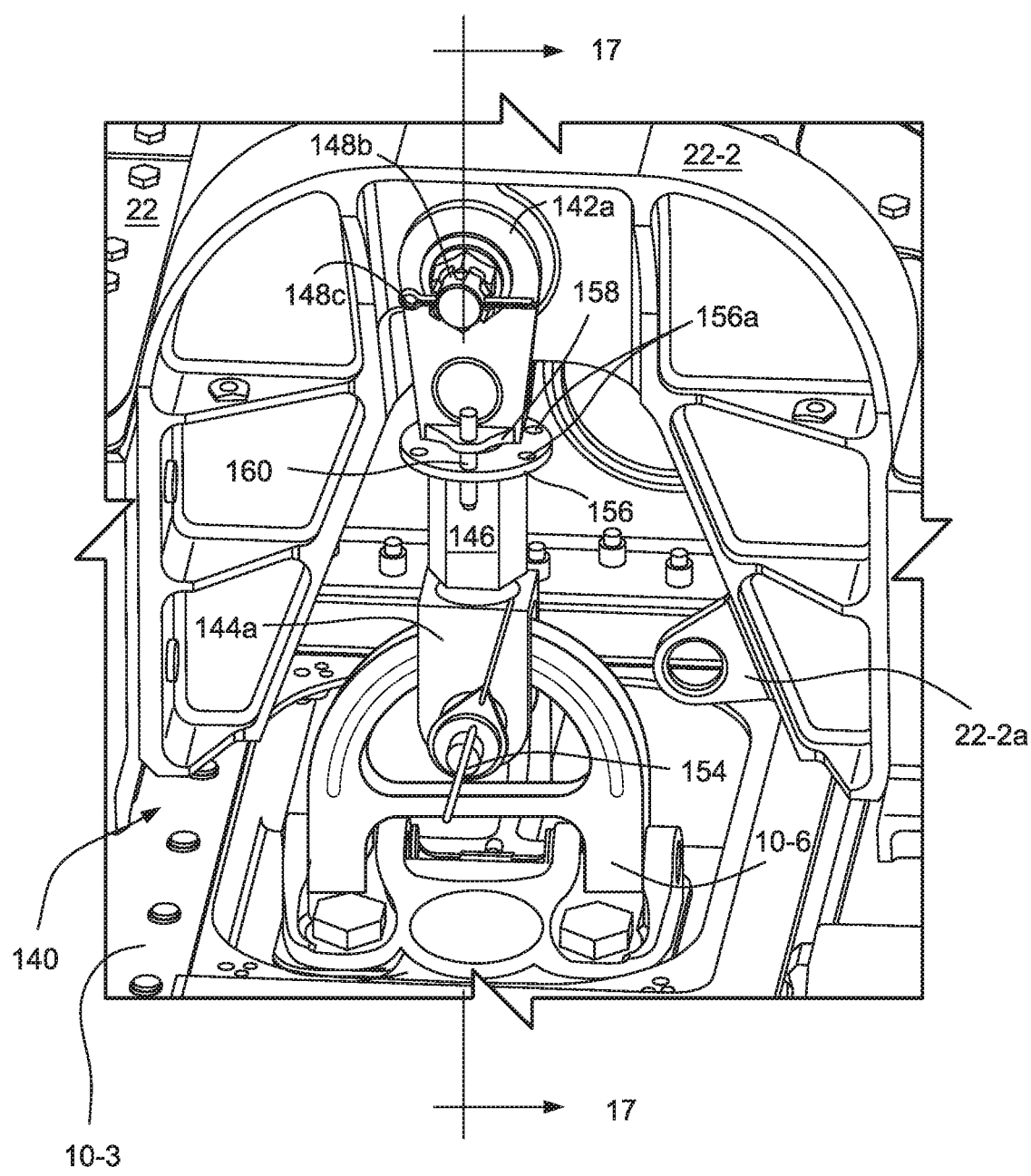
Figure 17:
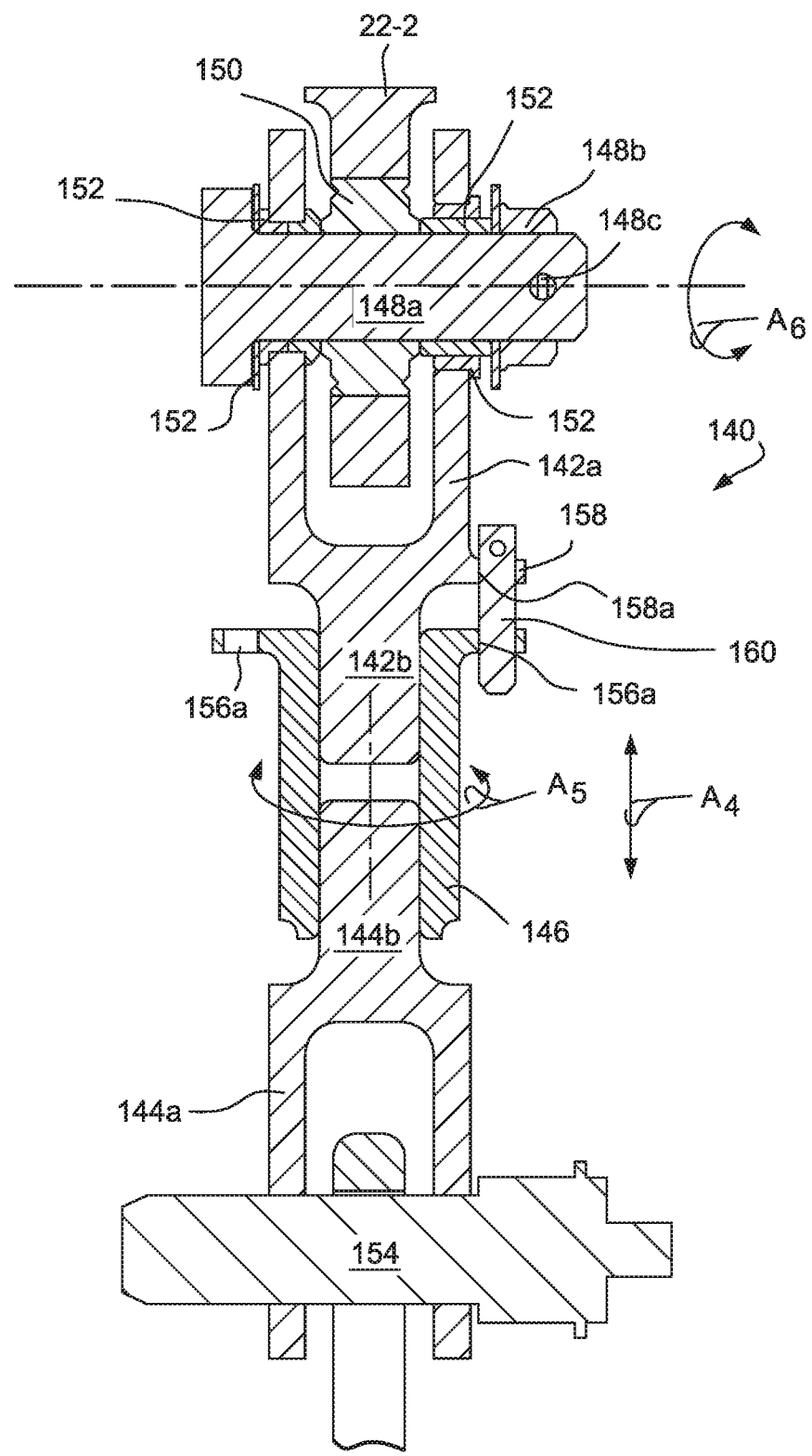
FIG. 17 is a cross-sectional elevational view of the representative end anti-rattle device in an engaged position as taken along lines 17-17 in FIG. 16.

The upper clevis connector 142a is operatively connected to the fitting 22-1 by a bolt 148a and castellated nut 148b extending through a bearing 150 integrated in a through opening of the fitting 22-2. A cotter pin 148c can be provided in an aperture of the bolt 148a so as to positionally fix the nut 148a onto the threaded shaft of the bolt 148a. Suitable shoulder bushings 152 which allow the device 140 to be pivoted about the axis of the bolt 148a (arrow $A_6$ in FIG. 17) between a stowed condition as shown in FIG. 15 and an operative condition as shown in FIG. 16.

A primary quick-release pin 154 is provided so as to extend through the openings of the lower clevis connector 144a. An apertured boss 22-2a extends from the U-shaped fitting 22-2 and mates with the clevis connector 144a so that the pin 154 can extend through the aligned openings of the clevis connector 144a and the boss 22-2a to thereby retain the device in the stowed condition as depicted in FIG. 15. In use device 140 can be pivoted about the axis of the bolt 148a between the stowed condition shown in FIG. 15 to the operative condition shown in FIG. 16 to allow the lower clevis connector 144a to receive therein a respective positionally fixed tie-down ring 10-6 associated with the cargo deck 10-3. The turnbuckle connector 146 may then be turned in one direction to increase the effective axial length of the device 140 by spreading the clevis connectors 142a, 144a apart sufficiently to allow the primary quick release pin 154 to extend through each of the openings of the clevis connectors 142a, 144a and through the tie-down ring 10-6. Thereafter, the application of reverse turning movement applied to the turnbuckle connector 124 will effectively axially shorten the length of the device 140 to thereby exert tension through the device 140 between the fitting 22-2 of the load platform 20 and the tie-down ring 10-6 thereby securely fixing the position of the load platform 22, and hence the fuel tank 24 supported thereby, to the cargo deck 10-3.

It will be observed that the turnbuckle connector 146 includes an upper flange 156 having a series of circumferentially spaced apart apertures 156a. The upper clevis connector 142a includes an outwardly extending boss 158 which defines an aperture 158a that is capable of being in registered alignment with one of the apertures 156a of the turnbuckle connector 146. A secondary quick release pin 160 may therefore be inserted through such apertures 156a, 158a when in registered alignment with one another to prevent turning movement of the turnbuckle connector 146 which in turn could loosen the tensioned connection with the tie-down ring 10-6.

It will be appreciated that the load platforms 22 and the fuel tanks 24 supported thereby could be oriented in various configurations, including a lengthwise configuration as depicted in FIG. 1 as well as widthwise configurations of one or more of the systems 20 in accordance with the embodiment described herein. Therefore, depending on the configuration and the fluid-connection between individual ones of the systems 20 and the fixed fuel tanks associated with the aircraft CA, a number of auxiliary fuel missions could be provided, including direct supply of the propulsion systems associated with the aircraft CA as well as air-to-air refueling missions.

It will also be appreciated while an auxiliary fuel tank 24 has been shown and depicted as being operatively engaged with the load platform 22, other types of cargo could be loaded and engaged with platform 22.

Thus, while reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. A modular auxiliary fuel tankage system comprising:
   (A) an aircraft cargo platform assembly comprising a load platform adapted to being positioned onto a cargo deck of a cargo aircraft;
   (B) a rigid rectangular fuel tank having mutually perpendicular side and bottom panels defining lower front, lateral and aft edges of the fuel tank; and
   (C) a plurality of tank connection assemblies removably connecting the fuel tank to the load platform at the lower front, lateral and aft edges, respectively, of the fuel tank, wherein
   each of the tank connection assemblies comprises:
      a lower fitting that is removably fixed to the aircraft cargo platform assembly, the lower fitting having at least one upwardly extending boss defining a lower fitting opening therethrough;
      an upper fitting having (a) a downwardly extending fitting boss defining an upper fitting opening therethrough which is aligned with the lower fitting opening of the lower fitting, and (b) an angle support plate rigidly connected to portions of the mutually perpendicular side and bottom panels of the fuel tank; and
      a bolt assembly positioned in the aligned lower and upper fitting openings to removably pivotally couple the lower and upper fittings to one another so as to connect the fuel tank to the load platform, and wherein
   the aircraft cargo platform assembly comprises:
      a plurality of anti-rattle devices operatively associated with the load platform along forward, aft and lateral sides thereof for positionally fixing the load platform to corresponding respective tie-down rings of the cargo deck, wherein each of the anti-rattle devices comprises:
- (i) an upper connector having one end pivotally attached to the load platform and a threaded shaft extending axially therefrom;
- (ii) a lower clevis connector having a threaded shaft extending therefrom in coaxial alignment with the threaded shaft of the upper connector;
- (iii) a turnbuckle connector connecting the coaxially aligned threaded shafts of the upper connector and lower clevis connector; and
- (iv) a primary quick-disconnect pin removably inserted in the lower clevis connector so as to be engaged with the tie-down ring of the cargo deck when the anti-rattle device is pivotally moved into an operative position.

2. The modular auxiliary fuel tankage system according to claim 1, wherein
the clevis connector comprises an outwardly extending boss defining a boss aperture, and wherein
the turnbuckle connector comprises a flange defining a series of circumferentially spaced-apart flange apertures capable of being brought into alignment with the boss aperture upon turning movement of the turnbuckle connector; and wherein
the anti-rattle device further comprises a secondary quick-disconnect pin capable of being inserted in a respective one of the flange apertures and the boss aperture when aligned to prevent turning movement of the turnbuckle connector.

3. The modular auxiliary fuel tankage system according to claim 2, further comprising a support fitting rigidly coupled to the cargo platform, and wherein the upper connector is pivotally connected to the support fitting to allow pivotal movements of the anti-rattle device between stowed and operative positions.

4. The modular auxiliary fuel tankage system according to claim 3, wherein
the support fitting comprises a pair of spaced apart apertured connection lobes, and wherein
the upper connector comprises an eyelet connector at one end thereof which is positioned between and pivotally connected to the connection lobes.

5. The modular auxiliary fuel tankage system according to claim 4, further comprising a bolt and nut assembly pivotally connecting the eyelet connector and the connection lobes.

6. The modular auxiliary fuel tankage system according to claim 1, wherein the aircraft cargo platform assembly comprises multiple pairs of the anti-rattle devices.

7. The modular auxiliary fuel tankage system according to claim 6, wherein the multiple pairs of the anti-rattle devices are positioned on at least lateral and rear sides of the load platform.

8. The modular auxiliary fuel tankage system according to claim 3, wherein the upper connector comprises an upper clevis connector which is pivotally connected to the support fitting.

9. The modular auxiliary fuel tankage system according to claim 8, wherein the support fitting includes an inverted U-shaped support fitting.

10. The modular auxiliary fuel tankage system according to claim 9, wherein the inverted U-shaped support fitting comprises an apertured boss extending inwardly therefrom which is sized and configured to be received in the lower clevis connector, wherein insertion of the primary quick-disconnect pin through the clevis connector and the apertured boss retains the anti-rattle device in the stowed position thereof.

11. A cargo aircraft comprising:
a fuselage defining a cargo space;
a cargo deck having tie-down rings in the cargo space; and
at least one modular auxiliary fuel tankage system according to claim 1.

12. The cargo aircraft according to claim 11, wherein one of the upper and lower fittings comprises a pair of separated first fitting bosses, and another of the upper and lower fittings comprises a second fitting boss received between and pivotally connected to the first fitting bosses by the bolt assembly.

13. The cargo aircraft according to claim 11, wherein
the clevis connector comprises an outwardly extending boss defining a boss aperture, and wherein
the turnbuckle connector comprises a flange defining a series of circumferentially spaced-apart flange apertures capable of being brought into alignment with the boss aperture upon turning movement of the turnbuckle connector; and wherein
the anti-rattle device further comprises a secondary quick-disconnect pin capable of being inserted in a respective one of the flange apertures and the boss aperture when aligned to prevent turning movement of the turnbuckle connector.

14. The cargo aircraft according to claim 13, further comprising a support fitting rigidly coupled to the cargo platform, and wherein the upper connector is pivotally connected to the support fitting to allow pivotal movements of the anti-rattle device between stowed and operative positions.

15. The cargo aircraft according to claim 14, wherein
the support fitting comprises a pair of spaced apart apertured connection lobes, and wherein
the upper connector comprises an eyelet connector at one end thereof which is positioned between and pivotally connected to the connection lobes.

16. The cargo aircraft according to claim 15, further comprising a bolt and nut assembly pivotally connecting the eyelet connector and the connection lobes.

17. The cargo aircraft according to claim 14, wherein the upper connector comprises an upper clevis connector which is pivotally connected to the support fitting.

18. The cargo aircraft according to claim 17, wherein the support fitting includes an inverted U-shaped support fitting.

19. The cargo aircraft according to claim 18, wherein the inverted U-shaped support fitting comprises an apertured boss extending inwardly therefrom which is sized and configured to be received in the lower clevis connector, wherein insertion of the primary quick-disconnect pin through the clevis connector and the apertured boss retains the anti-rattle device in the stowed position thereof.

20. The modular auxiliary fuel tankage system according to claim 1, wherein one of the upper and lower fittings comprises a pair of separated first fitting bosses, and another of the upper and lower fittings comprises a second fitting boss received between and pivotally connected to the first fitting bosses by the bolt assembly.

* * * * *